(12) United States Patent
Xu

(10) Patent No.: US 12,158,896 B2
(45) Date of Patent: Dec. 3, 2024

(54) METHOD, APPARATUS, AND COMPUTER STORAGE MEDIUM FOR CLOUD STORAGE INTERVAL UPDATING

(71) Applicant: ALIBABA GROUP HOLDING LIMITED, Grand Cayman (KY)

(72) Inventor: Yun Xu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/656,107

(22) Filed: Mar. 23, 2022

(65) Prior Publication Data

US 2022/0215039 A1 Jul. 7, 2022

Related U.S. Application Data

(63) Continuation of application No. PCT/CN2020/116404, filed on Sep. 21, 2020.

(30) Foreign Application Priority Data

Sep. 25, 2019 (CN) .......................... 201910913392.3

(51) Int. Cl.
*G06F 16/00* (2019.01)
*G06F 16/23* (2019.01)
*G06F 16/27* (2019.01)

(52) U.S. Cl.
CPC .......... *G06F 16/27* (2019.01); *G06F 16/2343* (2019.01)

(58) Field of Classification Search
CPC .............................. G06F 16/27; G06F 16/2343
See application file for complete search history.

(56) References Cited

U.S. PATENT DOCUMENTS

| | | | |
|---|---|---|---|
| 8,898,114 | B1 | 11/2014 | Feathergill et al. |
| 9,760,598 | B1 | 9/2017 | Holenstein et al. |
| 10,198,299 | B1 | 2/2019 | Xu et al. |
| 10,884,790 | B1 * | 1/2021 | Saidi .................. G06F 12/1027 |
| 2018/0232174 | A1 | 8/2018 | Zhou et al. |

(Continued)

FOREIGN PATENT DOCUMENTS

| | | |
|---|---|---|
| CN | 102084330 A | 6/2011 |
| CN | 102377809 A | 3/2012 |

(Continued)

OTHER PUBLICATIONS

European Patent Office Communication issued for Application No. 20867894.6 which encloses the extended European Search Report which includes pursuant to Rule 62 EPC, the Supplementary European Search Report (Art. 153(7) EPC) and the European search opinion, dated Sep. 26, 2022, 10 pages.

(Continued)

*Primary Examiner* — Khanh B Pham
(74) *Attorney, Agent, or Firm* — Finnegan, Henderson, Farabow, Garrett & Dunner, LLP

(57) ABSTRACT

The present disclosure discloses a method, an apparatus, and a computer storage medium for cloud storage interval updating. The method includes determining a cloud storage interval to be updated in a cloud storage system; determining a target cloud storage interval in the cloud storage system; and replicating data in the cloud storage interval to be updated to the target cloud storage interval based on a content verification.

15 Claims, 10 Drawing Sheets

(56) References Cited

U.S. PATENT DOCUMENTS

| | | | |
|---|---|---|---|
| 2018/0349034 A1* | 12/2018 | Lv | G06F 3/0604 |
| 2019/0034422 A1 | 1/2019 | Chen | |
| 2019/0213045 A1* | 7/2019 | Li | G06F 3/0619 |
| 2019/0245918 A1 | 8/2019 | Xu et al. | |
| 2019/0310881 A1* | 10/2019 | Gupta | G06F 9/45533 |

FOREIGN PATENT DOCUMENTS

| | | |
|---|---|---|
| CN | 103916459 A | 7/2014 |
| CN | 104298933 A | 1/2015 |
| CN | 104346284 A | 2/2015 |
| CN | 106570093 A | 4/2017 |
| CN | 106953893 A | 7/2017 |
| CN | 107037978 A | 8/2017 |
| CN | 108023746 A | 5/2018 |
| CN | 109284258 A | 1/2019 |
| CN | 109753493 A | 5/2019 |
| CN | 110019208 A | 7/2019 |
| CN | 110046510 A | 7/2019 |
| WO | WO 2021/057639 A1 | 4/2021 |

OTHER PUBLICATIONS

PCT International Search Report and Written Opinion mailed Dec. 21, 2020, issued in corresponding International Application No. PCT/CN2020/116404 (13 pgs.).

First Search Report issued in corresponding Chinese Application No. 2019109133923 on Dec. 14, 2021 (2 pages).

Search Report issued in corresponding Singapore Application No. 11202203087Q on May 9, 2024, 2024 (8 pages).

\* cited by examiner

METHOD, APPARATUS, AND COMPUTER STORAGE MEDIUM FOR CLOUD STORAGE INTERVAL UPDATING

CROSS-REFERENCE TO RELATED APPLICATIONS

The disclosure claims the benefits of priority to PCT Application No. PCT/CN2020/116404, filed on Sep. 21, 2020, which claims the benefits of priority to Chinese Patent Application No. 201910913392.3, filed on Sep. 25, 2019, both of which are incorporated herein by reference in their entireties.

TECHNICAL FIELD

The present disclosure generally relates to the field of storage data processing technologies, and specifically relate to a method, an apparatus, and a computer storage medium for cloud storage interval updating.

BACKGROUND

With development of data technologies, in order to improve the efficiency and security of data use, virtualization technologies came into being. A virtual machine is a complete computer system simulated by software with full hardware system functions and running in a completely isolated environment. Under a new-generation virtualization architecture, an input/output (IO) device of a virtual machine usually adopts a through-connection method, such as PCI (Peripheral Component Interconnect) passthrough. PCI passthrough refers to allowing a client machine to use a PCI device on a host exclusively, just like the PCI device is physically connected to the client machine. In this scenario, cache resources need to be allocated in advance, so that instant allocation is not accepted, and page replacement is not supported. Since page copy and update mapping involved in the page replacement are both executed by a CPU (Central Processing Unit), and the device side accesses a memory through Direct Memory Access (DMA) bypassing the CPU, it is difficult to guarantee whether a write operation has been performed on the device during the page replacement process. If a hardware or memory error occurs, the page replacement cannot be implemented on a physical machine where the virtual machine is located, which brings inconvenience to the use of storage resources. To solve this problem, generally, when pages need to be replaced or migrated, devices are usually stopped to avoid direct memory access during page replacement or migration. Or when a client machine initiates direct memory access, the client machine communicates with a virtual machine monitor to let the virtual machine monitor know which pages are processing direct memory access, so that the virtual machine monitor can control the direct memory access when needed. The above solutions all require the participation of a virtual machine system, therefore these solutions are limited by whether an internal system of the virtual machine is turned on or supports corresponding functions, whether the virtual machine can cooperate with the client machine, and whether the client machine can cooperate with the virtual machine monitor. However, it is hard to apply such solutions in an environment such as cloud storage.

SUMMARY OF THE DISCLOSURE

A method, an apparatus, and a computer storage medium for cloud storage interval updating are provided in embodiments of the present disclosure.

In the first aspect, a method for cloud storage interval updating is provided in some embodiments of the present disclosure.

Specifically, the cloud storage interval updating method includes: determining a cloud storage interval to be updated in a cloud storage system; determining a target cloud storage interval in the cloud storage system; and replicating data in the cloud storage interval to be updated to the target cloud storage interval based on a content verification.

With reference to the first aspect, in a first implementation of the first aspect of the embodiment of the present disclosure, the replicating the data in the cloud storage interval to be updated to the target cloud storage interval based on a content verification further includes: clearing data directory information of the cloud storage interval to be updated; replicating the data in the cloud storage interval to be updated to the target cloud storage interval; calculating a first content check value of the target cloud storage interval obtained after the data in the cloud storage interval to be updated is replicated; locking the cloud storage interval to be updated, and calculating a second content check value of the cloud storage interval to be updated; and sending information of the target cloud storage interval to a memory management unit when the first content check value matches the second content check value.

With reference to the first aspect and the first implementation of the first aspect, in a second implementation of the first aspect of the embodiment of the present disclosure, after the calculating a first content check value of the target cloud storage interval obtained after the data is replicated, the method further includes: locking an input/output index address ring data component, wherein the input/output index address ring data component stores an index address pointing to a physical address corresponding to the cloud storage interval; and detecting whether a distance between a position of the target cloud storage interval in the input/output index address ring data component and a current operating position of the input/output index address ring data component is greater than a preset distance threshold; and the locking the cloud storage interval to be updated, and calculating a second content check value of the cloud storage interval to be updated is implemented as: when the distance between the position of the target cloud storage interval and the current operating position of the input/output index address ring data component is greater than or equal to the preset distance threshold, locking the cloud storage interval to be updated, and calculating the second content check value of the cloud storage interval to be updated.

With reference to the first aspect, the first implementation of the first aspect, and the second implementation of the first aspect, in a third implementation of the first aspect of the present disclosure, after detecting whether the distance between a position of the target cloud storage interval and the current operating position of the input/output index address ring data component is greater than the preset distance threshold, the method further includes: when the distance between the position of the target cloud storage interval and the current operating position of the input/output index address ring data component is less than the preset distance threshold, unlocking the input/output index address ring data component to enter a sleep state preset time; and returning to clear the data directory information of the cloud storage interval to be updated again.

With reference to the first implementation of the first aspect, the second implementation of the first aspect, and the third implementation of the first aspect, in a fourth implementation of the first aspect of the present disclosure, the sending information of the target cloud storage interval to the memory management unit when the first content check value matches the second content check value is implemented as: sending the information of the target cloud storage interval to the memory management unit when the first content check value matches the second content check value; and unlocking the input/output index address ring data component.

With reference to the first aspect, the first implementation of the first aspect, the second implementation of the first aspect, the third implementation of the first aspect, and the fourth implementation of the first aspect, in a fifth implementation of the first aspect of the present disclosure, after locking the cloud storage interval to be updated, and calculating the second content check value of the cloud storage interval to be updated, the method further includes: when the first content check value does not match the second content check value, returning to replicate the data in the cloud storage interval to be updated to the target cloud storage interval again.

In a second aspect, an apparatus for cloud storage interval updating is provided in some embodiments of the present disclosure.

Specifically, the cloud storage interval updating apparatus includes: a first determining module configured to determine a cloud storage interval to be updated in a cloud storage system; a second determining module configured to determine a target cloud storage interval in the cloud storage system; and a replicating module configured to replicate data in the cloud storage interval to be updated to the target cloud storage interval based on a content verification.

With reference to the second aspect, in a first implementation of the second aspect of the embodiment of the present disclosure, the replicating module includes: a clearing sub-module configured to clear data directory information of the cloud storage interval to be updated; a replicating sub-module configured to replicate the data in the cloud storage interval to be updated to the target cloud storage interval; a calculating sub-module configured to calculate a first content check value of the target cloud storage interval obtained after the data is replicated; a first locking sub-module configured to lock the cloud storage interval to be updated and calculate a second content check value of the cloud storage interval to be updated; and a sending sub-module configured to send information of the target cloud storage interval to a memory management unit when the first content check value matches the second content check value.

With reference to the second aspect and the first implementation of the second aspect, in a second implementation of the second aspect of the embodiment of the present disclosure, the replicating module further includes: a second locking sub-module configured to lock an input/output index address ring data component, wherein the input/output index address ring data component stores an index address pointing to a physical address corresponding to the cloud storage interval; and a detecting sub-module configured to detect whether a distance between a position of the target cloud storage interval in the input/output index address ring data component and a current operating position of the input/output index address ring data component is greater than a preset distance threshold; and the first locking sub-module is further configured to: when the distance between the position of the target cloud storage interval and the current operating position of the input/output index address ring data component is greater than or equal to the preset distance threshold, lock the cloud storage interval to be updated, and calculate the second content check value of the cloud storage interval to be updated.

With reference to the second aspect, the first implementation of the second aspect, and the second implementation of the second aspect, in a third implementation of the second aspect of the present disclosure, the replicating module further includes: an unlocking sub-module configured to, when the distance between the position of the target cloud storage interval and the current operating position of the input/output index address ring data component is less than the preset distance threshold, unlock the input/output index address ring data component to enter a sleep state preset time and return to clear the data directory information of the cloud storage interval to be updated again.

With reference to the second aspect, the first implementation of the second aspect, the second implementation of the second aspect, and the third implementation of the second aspect, in a fourth implementation of the second aspect of the present disclosure, the sending sub-module is further configured to: send the information of the target cloud storage interval to the memory management unit when the first content check value matches the second content check value, for unlocking the input/output index address ring data component.

With reference to the second aspect, the first implementation of the second aspect, the second implementation of the second aspect, the third implementation of the second aspect, and the fourth implementation of the second aspect, in a fifth implementation of the second aspect of the present disclosure, the replicating module further includes: a returning sub-module configured to, when the first content check value does not match the second content check value, return to replicate the data in the cloud storage interval to be updated to the target cloud storage interval again.

In a third aspect, an electronic device is provided in some embodiments of the present disclosure. The electronic device includes a memory and a processor. The memory is used for storing one or more computer instructions supporting a storage interval updating apparatus to perform the storage interval updating method in the above first aspect, and the processor is configured to execute the computer instructions stored in the memory. The storage interval updating apparatus can further include a communication interface for communicating the storage interval updating apparatus with another device or communication network.

In a fourth aspect, a computer-readable storage medium is provided in some embodiments of the present disclosure for storing computer instructions used by a storage interval updating apparatus. The computer-readable storage medium includes computer instructions involved by the storage interval updating apparatus for performing the storage interval updating method in the above first aspect.

It should be understood that the above general description and the following detailed description are only exemplary and explanatory, which do not limit the embodiments of the present disclosure.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

In the technical solution provided in the embodiments of the present disclosure, data in a cloud storage interval to be updated can be replicated to a target cloud storage interval based on content verification and further based on a control of an input/output index address ring data components. In a virtualized through-connection scenario, in the technical solution, by controlling the input/output index address ring data components, page replacement or migration can be safely implemented merely based on a method of content verification, without participation of through-connection devices and client machines or communication between through-connection devices and client machines, thereby simplifying a page replacement process, reducing the amount of communication data, and saving communication resources.

Figure 1:
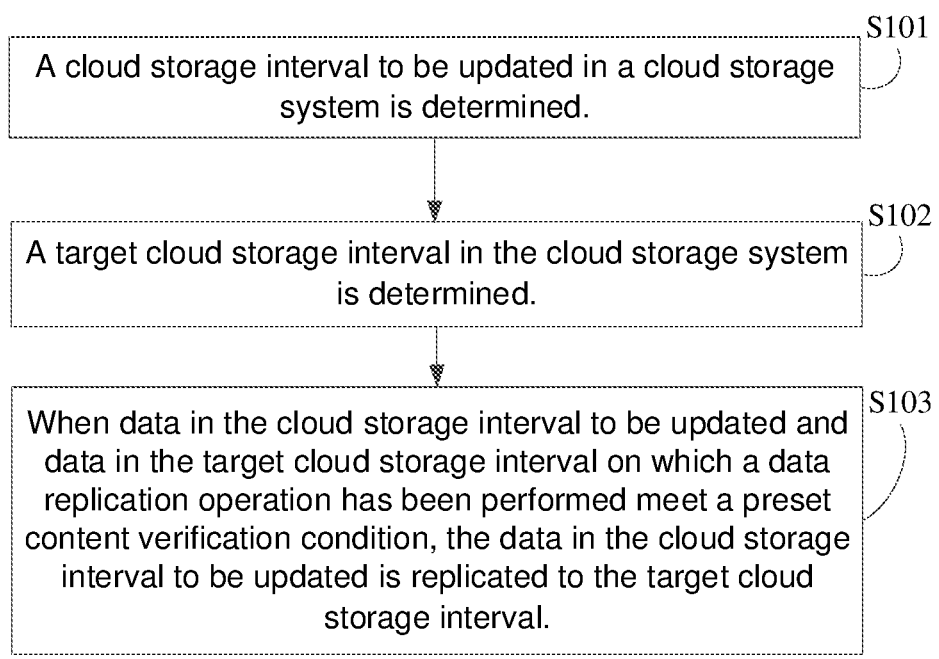
FIG. 1 shows an exemplary flow chart of a storage interval updating method according to some embodiments of the present disclosure.

FIG. 1 shows a flow chart of a storage interval updating method according to some embodiments of the present disclosure. As shown in FIG. 1, the storage interval updating method includes the following steps S101 to S103.

In step S101, a cloud storage interval to be updated in a cloud storage system is determined.

In step S102, a target cloud storage interval in the cloud storage system is determined.

In step S103, data in the cloud storage interval to be updated is replicated to the target cloud storage interval based on a content verification. When the data in the cloud storage interval to be updated and data in the target cloud storage interval on which a data replication operation has been performed meet a preset content verification condition, the replication of data from the cloud storage interval to be updated to the targe storage interval is successfully completed. When the data in the cloud storage interval to be updated and data in the target cloud storage interval on which a data replication operation has been performed does not meet a preset content verification condition, step S103 is repeated, for example, after a preset time period.

As mentioned above, with the development of data technologies, in order to improve the efficiency and security of data use, virtualization technologies came into being. A virtual machine is a complete computer system simulated by software with full hardware system functions and running in a completely isolated environment. Under a new-generation virtualization architecture, an input/output (IO) device of a virtual machine usually adopts a through-connection method, such as PCI (Peripheral Component Interconnect) passthrough. PCI passthrough refers to allowing a client machine to use a PCI device on a host exclusively, just like the PCI device is physically connected to the client machine. In this scenario, cache resources need to be allocated in advance, so that instant allocation is not accepted, and page replacement is not supported. Since page copy and update mapping involved in the page replacement are both executed by a CPU (Central Processing Unit), and the device side accesses a memory through Direct Memory Access (DMA) bypassing the CPU, it is difficult to guarantee whether a write operation has been performed on the device in the page replacement process. If a hardware or memory error occurs, the page replacement cannot be implemented on a physical machine where the virtual machine is located, which brings inconvenience to the use of storage resources. To solve this problem, generally, when pages need to be replaced or migrated, devices are usually stopped to avoid direct memory access during page replacement or migration. Or when a client machine initiates direct memory access, the client machine communicates with a virtual machine monitor to let the virtual machine monitor know which pages are processing direct memory access, so that the virtual machine monitor can control the direct memory access when needed. The above solutions all require participation of a virtual machine system, therefore these solutions are limited by whether an internal system of the virtual machine is turned on or supports corresponding functions, and whether the virtual machine can cooperate with the client machine. However, it is hard to apply such solutions in an environment such as cloud storage.

Considering the above problems, in this example, a storage interval updating method is proposed. In the method, data in a cloud storage interval to be updated can be replicated to a target cloud storage interval based on content verification and further based on a control of an input/output index address ring data component. In a virtualized through-connection scenario, in the technical solution, by controlling the input/output index address ring data components, page replacement or migration can be safely implemented merely based on a method of content verification, without the participation of through-connection devices or client machines, or communication between through-connection devices or client machines, thereby simplifying a page replacement process, reducing the amount of communication data, and saving communication resources.

In some embodiments of the present disclosure, a cloud storage interval refers to an interval used for storing data in storage resources of a cloud storage system, which can also be referred to as a storage page. The cloud storage interval to be updated refers to a data storage interval that cannot provide stable data storage services due to data storage failures or other reasons, so that the data stored in the cloud storage interval to be updated needs to be migrated to another data storage interval, that is, the cloud storage interval to be updated is a data storage interval needs to be updated. The cloud storage interval to be updated can also be referred to as a source storage interval. A data storage failure can be, for example, a memory failure, a storage hardware failure, etc.

In some embodiments of the present disclosure, step S101 that determining a cloud storage interval to be updated in a cloud storage system can be implemented as: in response to a cloud storage interval error message being detected, the cloud storage interval to be updated in the cloud storage system, such as a source page that needs to be replaced, is determined.

In some embodiments of the present disclosure, a target cloud storage interval refers to a cloud storage interval that has no corresponding data storage failures, and can provide stable data storage services normally. The cloud storage interval is in an idle state, and can accept data migrated from another cloud storage interval to be updated. For example, the targe cloud storage can be an idle replacement target page.

In some embodiments of the present disclosure, step S102 that determining a target cloud storage interval in the cloud storage system can be implemented as: acquiring an available cloud storage interval, and determining the target cloud storage interval in the available cloud storage interval.

There can be one or more available cloud storage intervals. In this case, one cloud storage interval can be determined from the one or more available cloud storage intervals as the target cloud storage interval for accepting data migration. In some embodiments of the present disclosure, one cloud storage interval can be randomly determined from the one or more available cloud storage intervals as the target cloud storage interval, or the target cloud storage interval can be determined according to a preset determination rule. The preset determination rule can be determined by those skilled in the art according to practical application requirements and characteristics of the cloud storage interval, which will not be specifically limited herein.

Figure 2:
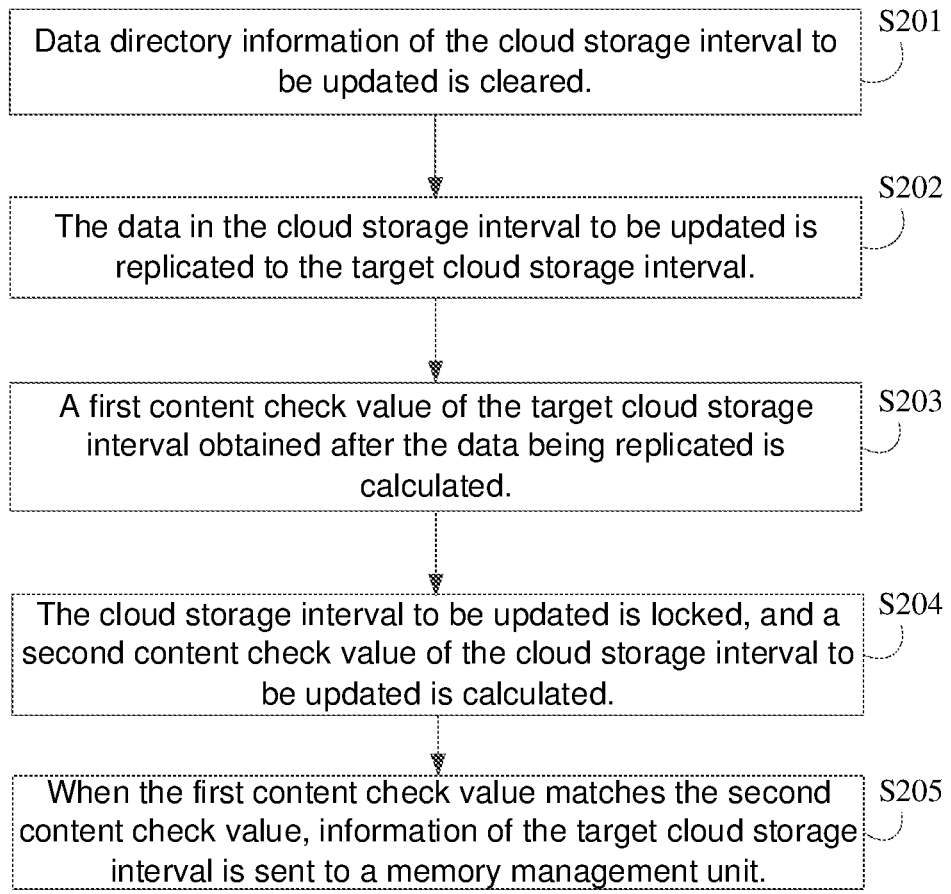
FIG. 2 shows an exemplary flow chart of step S103 of the storage interval updating method according to the embodiment shown in FIG. 1.

In some embodiments of the present disclosure, as shown in FIG. 2, step S103 that replicating the data in the cloud storage interval to be updated to the target cloud storage interval based on a content verification can further include the following steps S201 to S205.

In step S201, data directory information of the cloud storage interval to be updated is cleared.

In step S202, the data in the cloud storage interval to be updated is replicated to the target cloud storage interval.

In step S203, a first content check value of the target cloud storage interval obtained after the data being replicated is calculated.

In step S204, the cloud storage interval to be updated is locked, and a second content check value of the cloud storage interval to be updated is calculated.

In step S205, when the first content check value matches the second content check value, information of the target cloud storage interval is sent to a memory management unit.

In order to ensure the integrity and security of data migration, in this example, data migration and replacement and update between cloud storage intervals are implemented based on content verification. Specifically, data directory information, such as page table entries, of the cloud storage interval to be updated is cleared in a memory management unit (MMU) and a virtualization extended page table (EPT). Then, the data in the cloud storage interval to be updated is replicated to the target cloud storage interval. A first content check value of the target cloud storage interval obtained after the data being replicated is calculated. The first content check value is used to be compared with a subsequent second content check value of the cloud storage interval to be updated to determine a consistency of data content between the cloud storage intervals. If the first content check value matches the second content check value, for example, the first content check value is equal to the second content check value, it indicates that the data stored in the cloud storage interval to be updated is consistent with the data content stored in the target cloud storage interval after the data being migrated, which means that there is no data change during the data migration process. Then, the cloud storage interval to be updated is locked. For example, the cloud storage interval to be updated is marked as write-protected by the virtualization extended page table (EPT), and a second content check value of the cloud storage interval to be updated is calculated. Finally, the first content check value is compared with the second content check value. As described above, when the first content check value matches the second content check value, it is considered that there is no data change during the data migration process, that is, the data migration is successful. At this time, the information of the target cloud storage interval can be sent to the memory management unit to update management information of the cloud storage intervals stored in the memory management unit.

In some embodiment of the present disclosure, the data directory information can include one or more of the following information: a physical address, attribute information of a corresponding cloud storage interval, etc.

In some embodiments of the present disclosure, the content check value can be obtained by calculation using an MD5 Message-Digest Algorithm. The MD5 Message-Digest Algorithm is a cryptographic hash function that can generate a hash value with a certain length to represent content to be checked. Of course, the content check value can also be calculated by using another content check value calculation method. Those skilled in the art can select a suitable content check value calculation method according to the needs of practical applications and the characteristics of the content to be checked, for which there is no specific limitation in the present disclosure.

Figure 3:
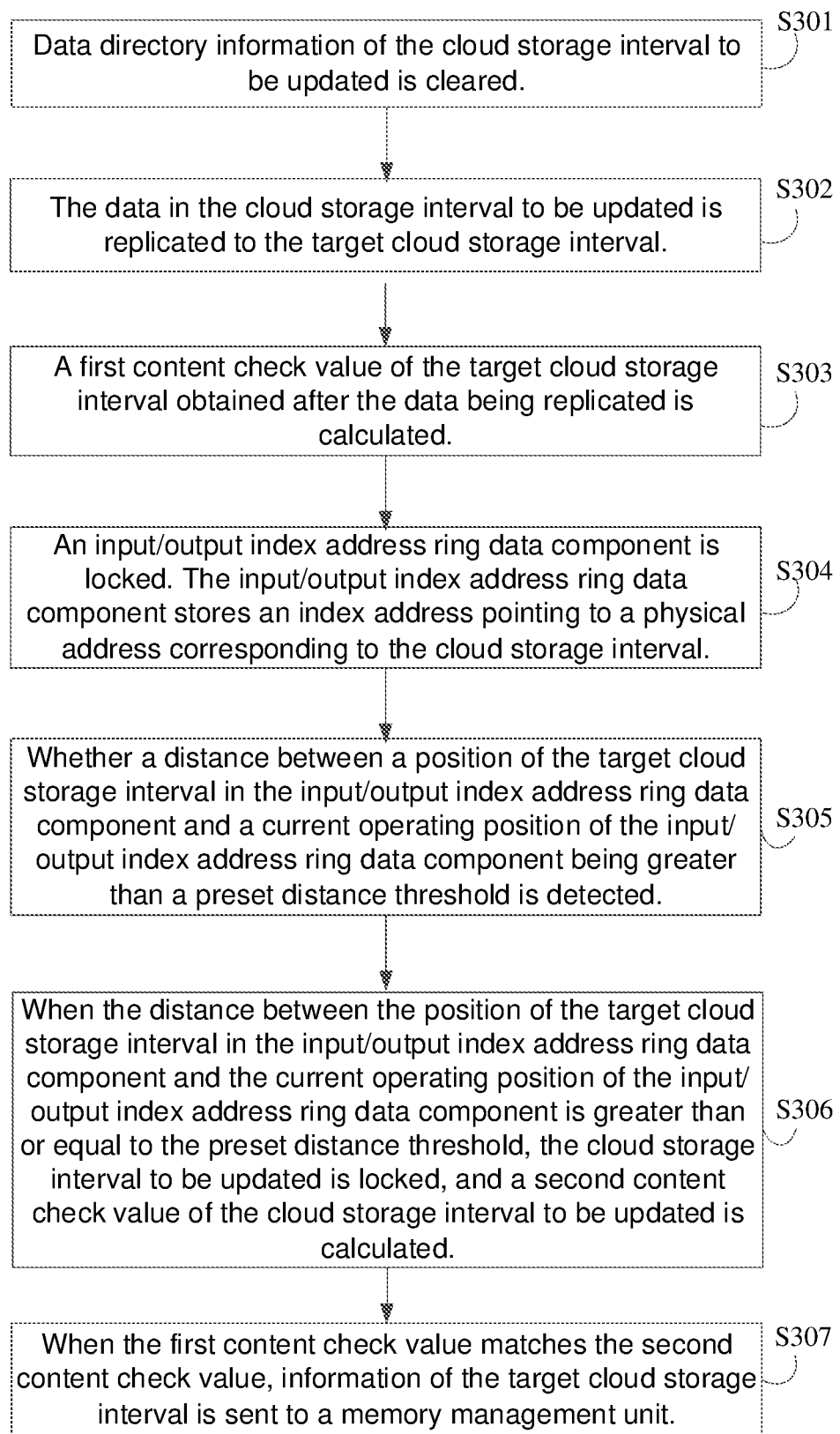
FIG. 3 shows another exemplary flow chart of step S103 of the storage interval updating method according to the embodiment shown in FIG. 1.

In some embodiments of the present disclosure, after step S203 that calculating the first content check value of the target cloud storage interval obtained after the data being replicated, the method can further include a step of determining whether the target cloud storage interval is likely to be accessed in a short time. As shown in FIG. 3, step S103 that replicating the data in the cloud storage interval to be updated to the target cloud storage interval based on a content verification can further include the following steps S301 to S307.

In step S301, data directory information of the cloud storage interval to be updated is cleared.

In step S302, the data in the cloud storage interval to be updated is replicated to the target cloud storage interval.

In step S303, a first content check value of the target cloud storage interval obtained after the data being replicated is calculated.

In step S304, an input/output index address ring data component is locked. The input/output index address ring data component stores an index address pointing to a physical address corresponding to the cloud storage interval.

In step S305, whether a distance between a position of the target cloud storage interval in the input/output index address ring data component and a current operating position of the input/output index address ring data component being greater than a preset distance threshold is detected.

In step S306, when the distance between the position of the target cloud storage interval in the input/output index address ring data component and the current operating position of the input/output index address ring data component is greater than or equal to the preset distance threshold, the cloud storage interval to be updated is locked, and a second content check value of the cloud storage interval to be updated is calculated.

In step S307, when the first content check value matches the second content check value, information of the target cloud storage interval is sent to a memory management unit.

In order to prevent the target cloud storage interval from being accessed during the implementation of data migration, which can lead to errors in the migrated data, in this example, after the first content check value of the target cloud storage interval obtained after the data being replicated is calculated, the input/output index address ring data component storing the index address pointing to the physical address corresponding to the cloud storage interval is locked. For example, the input/output index address ring data component is marked as write-protected by the virtualization extended page table (EPT) to prevent the CPU side from operating on the input/output index address ring data component. Therefore, it is guaranteed that the target cloud storage interval of the data write operation in the current state is a certain set. An operation on the input/output index address ring data component by the virtual machine during the data migration process, which can further affect the data migration, can be prevented. Then, whether a distance between the position of the target cloud storage interval in the input/output index address ring data component and the current operation position of the input/output index address ring data component being greater than a preset distance threshold is detected, which is equivalent to detecting whether a page to be replaced is in an inbound direction of the input/output index address ring data component to determine whether the data migration operation of the target cloud storage interval is secure within a preset time period, for example, whether the data migration operation conflicts with the operation of the input/output index address ring data component, or whether the target cloud storage interval is likely to be accessed in a short time. The preset time period is at least greater than or equal to a time required for the data migration. When the distance between the position of the target cloud storage interval and the current operating position of the input/output index address ring data component is greater than or equal to the preset distance threshold, or when the page that needs to be replaced is not in the inbound direction of the input/output index address ring data component, it is considered that the data migration operation of the target cloud storage interval is secure within the preset time period, that is, the target cloud storage interval will not be accessed in a short time, and the data migration operation does not conflict with the operation of the input/output index address ring data component. At this time, the cloud storage interval to be updated is locked then, and the second content check value of the cloud storage interval to be updated is calculated.

In some embodiments of the present disclosure, when the distance between the position of the target cloud storage interval and the current operating position of the input/output index address ring data component is less than the preset distance threshold, or when the page that needs to be replaced is in the inbound direction of the input/output index address ring data component, it is considered that the data migration operation of the target cloud storage interval is insecure within the preset time period, for example, the target cloud storage interval may be accessed in a short time, or the data migration operation may conflict with the operation of the input/output index address ring data component. At this time, the input/output index address ring data component is unlocked and enters a sleep state. After staying in the sleep state for a preset time, the method returns to step S301 that clearing the data directory information of the cloud storage interval to be updated, to avoid the risk of a data operation conflict that may occur.

Figure 4:
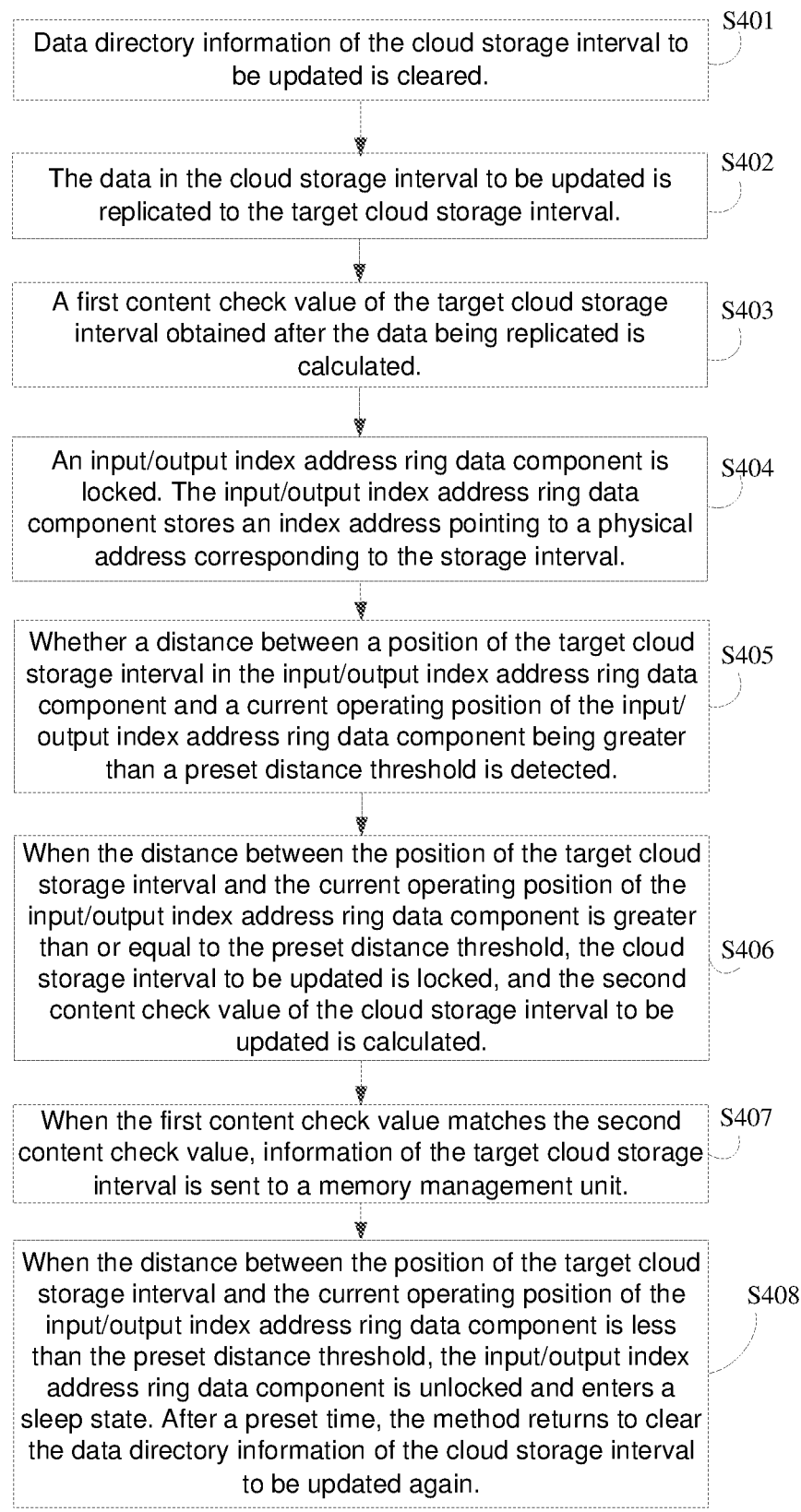
FIG. 4 shows yet another exemplary flow chart of step S103 of the storage interval updating method according to the embodiment shown in FIG. 1.

In some embodiments of the present disclosure, as shown in FIG. 4, step S103 that replicating the data in the cloud storage interval to be updated to the target cloud storage interval based on a content verification can further include the following steps S401 to S408.

In step S401, data directory information of the cloud storage interval to be updated is cleared.

In step S402, the data in the cloud storage interval to be updated is replicated to the target cloud storage interval.

In step S403, a first content check value of the target cloud storage interval obtained after the data being replicated is calculated.

In step S404, an input/output index address ring data component is locked. The input/output index address ring data component stores an index address pointing to a physical address corresponding to the storage interval.

In step S405, whether a distance between a position of the target cloud storage interval in the input/output index address ring data component and a current operating position of the input/output index address ring data component being greater than a preset distance threshold is detected.

In step S406, when the distance between the position of the target cloud storage interval and the current operating position of the input/output index address ring data component is greater than or equal to the preset distance threshold, the cloud storage interval to be updated is locked, and the second content check value of the cloud storage interval to be updated is calculated.

In step S407, when the first content check value matches the second content check value, information of the target cloud storage interval is sent to a memory management unit.

In step S408, when the distance between the position of the target cloud storage interval and the current operating position of the input/output index address ring data component is less than the preset distance threshold, the input/output index address ring data component is unlocked and enters a sleep state. After a preset time, the method returns to clear the data directory information of the cloud storage interval to be updated again.

In some embodiments of the present disclosure, as described above, when the first content check value matches the second content check value, it indicates that the data stored in the cloud storage interval to be updated is consistent with the data content stored in the target cloud storage interval after the data migration, that means there is no data change during the data migration process. Therefore, the information of the target cloud storage interval can be sent to the memory management unit (MMU) or input/output memory management unit (IOMMU) for data update. At this time, it is considered that the data migration process is completed. The input/output index address ring data component can be unlocked by the virtualization extended page table (EPT), that is, the write protection of the input/output index address ring data component is removed and normal access operations are restored. In this example, step S407 that sending the information of the target cloud storage interval to the memory management unit when the first content check value matches the second content check value, can be implemented as: sending the information of the target cloud storage interval to the memory management unit when the first content check value matches the second content check value, and unlocking the input/output index address ring data component.

Figure 5:
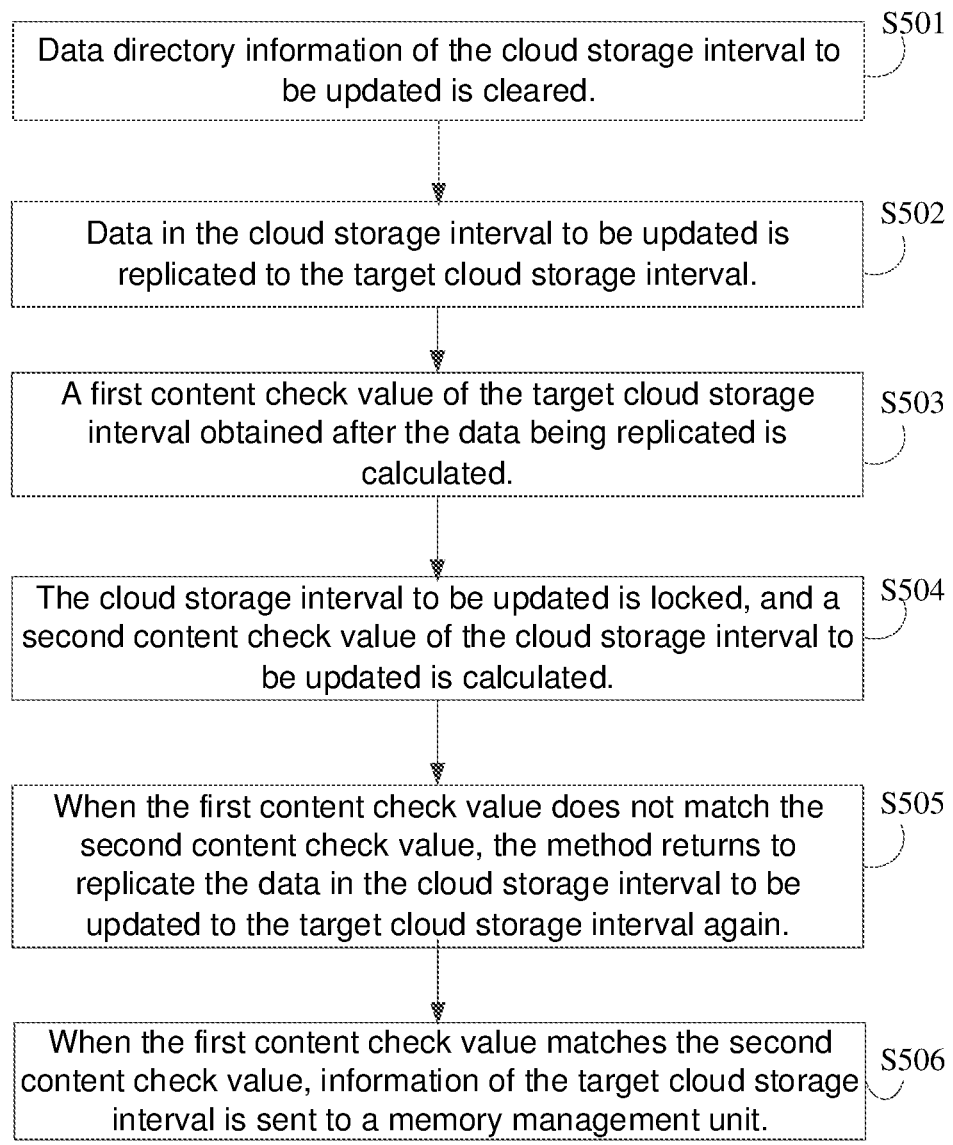
FIG. 5 shows yet another exemplary flow chart of step S103 of the storage interval updating method according to the embodiment shown in FIG. 1.

In some embodiments of the present disclosure, after step S204 that locking the cloud storage interval to be updated, and calculating the second content check value of the cloud storage interval to be updated, the method can further include: when the first content check value does not match the second content check value, returning to the step of replicating the data in the cloud storage interval to be updated to the target cloud storage interval again. As shown in FIG. 5, step S103 that replicating the data in the cloud storage interval to be updated to the target cloud storage interval based on a content verification can further include the following steps S501 to S506.

In step S501, data directory information of the cloud storage interval to be updated is cleared.

In step S502, data in the cloud storage interval to be updated is replicated to the target cloud storage interval.

In step S503, a first content check value of the target cloud storage interval obtained after the data being replicated is calculated.

In step S504, the cloud storage interval to be updated is locked, and a second content check value of the cloud storage interval to be updated is calculated.

In step S505, when the first content check value does not match the second content check value, the method returns to replicate the data in the cloud storage interval to be updated to the target cloud storage interval again.

In step S506, when the first content check value matches the second content check value, information of the target cloud storage interval is sent to a memory management unit.

When the first content check value does not match the second content check value, it means that the data stored in the cloud storage interval to be updated is inconsistent with the data content stored in the target cloud storage interval after data migration, and data change may occur in the data migration process. At this time, it is necessary to return to step S502 that replicating the data in the cloud storage interval to be updated to the target cloud storage interval again, and perform the data migration operation again.

The following are embodiments for apparatus of the present disclosure, which can be used to implement the method of the present disclosure.

Figure 6:
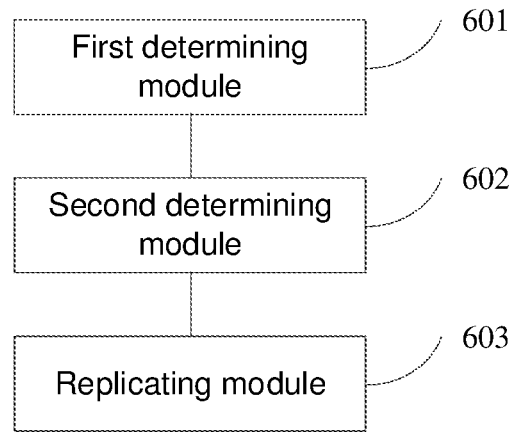
FIG. 6 shows an exemplary structural block diagram of a storage interval updating apparatus according to some embodiments of the present disclosure.

FIG. 6 shows a structural block diagram of a storage interval updating apparatus according to some embodiments of the present disclosure. The apparatus can be implemented as part or all of an electronic device through software, hardware, or a combination of the two. As shown in FIG. 6, the storage interval updating apparatus includes a first determining module 601, a second determining module 602, and a replicating module 603. It is understandable that each module/sub-module can include one or more hardware components, for example, circuitry, for performing corresponding functions.

First determining module 601 is configured to determine a cloud storage interval to be updated in a cloud storage system.

Second determining module 602 is configured to determine a target cloud storage interval in the cloud storage system.

Replicating module 603 is configured to replicate the data in the cloud storage interval to be updated to the target cloud storage interval based on a content verification.

As mentioned above, with the development of data technologies, in order to improve the efficiency and security of data use, virtualization technologies came into being. A virtual machine is a complete computer system simulated by software with full hardware system functions and running in a completely isolated environment. Under a new-generation virtualization architecture, an input/output (IO) device of a virtual machine usually adopts a through-connection method, such as PCI (Peripheral Component Interconnect) passthrough. PCI passthrough refers to allowing a client machine to use a PCI device on a host exclusively, just like the PCI device is physically connected to the client machine. In this scenario, cache resources need to be allocated in advance, so that instant allocation is not accepted, and page replacement is not supported. Since page copy and update mapping involved in the page replacement are both executed by a CPU (Central Processing Unit), and the device side accesses a memory through Direct Memory Access (DMA) bypassing the CPU, it is difficult to guarantee whether a write operation has been performed on the device during the page replacement process. If a hardware or memory error occurs, the page replacement cannot be implemented on a physical machine where the virtual machine is located, which brings inconvenience to the use of storage resources. To solve this problem, generally, when pages need to be replaced or migrated, devices are usually stopped to avoid direct memory access during page replacement or migration, or when a client machine initiates direct memory access, the client machine communicates with a virtual machine monitor to let the virtual machine monitor know which pages are processing direct memory access, so that the virtual machine monitor can control the direct memory access when needed. The above solutions all require the participation of a virtual machine system, therefore these solutions are limited by whether an internal system of the virtual machine is turned on or supports corresponding functions, and whether the virtual machine can cooperate with the client machine. However, it is hard to apply such solutions in an environment such as cloud storage.

Considering the above problems, in this example, a storage interval updating apparatus is proposed. The apparatus replicates the data in the cloud storage interval to be updated to the target cloud storage interval based on content verification and further based on a control of the input/output index address ring data component. In a virtualized through-connection scenario, in the technical solution, by controlling the ring data components of the input/output index address, page replacement or migration can be safely implemented merely based on a method of content verification, without the participation or communication of through-connection devices or client machines, thereby simplifying a page replacement process, reducing the amount of communication data, and saving communication resources.

In some embodiments of the present disclosure, a cloud storage interval refers to an interval used for storing data in storage resources of a cloud storage system, which can also be referred to as a storage page. The cloud storage interval to be updated refers to a data storage interval that cannot provide stable data storage services due to data storage failures or other reasons, so that the data stored in the cloud storage interval to be updated needs to be migrated to another data storage interval, that is, the cloud storage interval to be updated is a data storage interval needs to be updated. The cloud storage interval to be updated can also be referred to as a source storage interval. A data storage failure can be, for example, a memory failure, a storage hardware failure, etc.

In some embodiments of the present disclosure, first determining module 601 can be configured to: in response to a cloud storage interval error message being detected, determine the cloud storage interval to be updated in the cloud storage system, such as a source page that needs to be replaced.

In some embodiments of the present disclosure, a target cloud storage interval refers to a cloud storage interval that has no corresponding data storage failures and can provide stable data storage services normally. The cloud storage interval is in an idle state and can accept data migrated from another cloud storage interval to be updated. For example, the targe cloud storage can be an idle replacement target page.

In some embodiments of the present disclosure, second determining module 602 can be further configured to: acquire an available cloud storage interval and determine the target cloud storage interval in the available cloud storage interval.

There can be one or more available cloud storage intervals. In this case, one cloud storage interval can be determined from the one or more available cloud storage intervals as the target cloud storage interval for accepting data migration. In some embodiments of the present disclosure, a cloud storage interval can be randomly determined from the one or more available cloud storage intervals as the target cloud storage interval, or the target cloud storage interval can be determined according to a preset determination rule. The preset determination rule can be determined by those skilled in the art according to actual application requirements and characteristics of the cloud storage interval, which will not be specifically limited herein.

Figure 7:
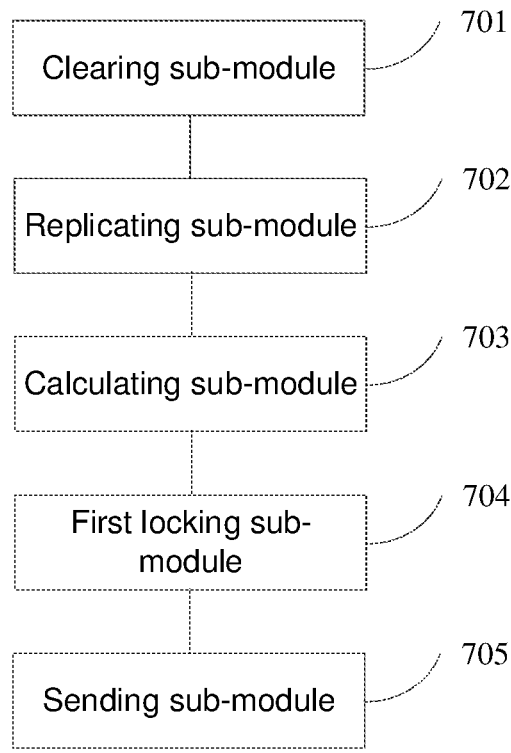
FIG. 7 shows an exemplary structural block diagram of replicating module 603 according to the embodiment shown in FIG. 6.

In some embodiments of the present disclosure, as shown in FIG. 7, replicating module 603 can further include a clearing sub-module 701, a replicating sub-module 702, a calculating sub-module 703, a first locking sub-module 704, and a sending sub-module 705.

Clearing sub-module 701 is configured to clear data directory information of the cloud storage interval to be updated.

Replicating sub-module 702 is configured to replicate the data in the cloud storage interval to be updated to the target cloud storage interval.

Calculating sub-module 703 is configured to calculate a first content check value of the target cloud storage interval obtained after the data is replicated.

First locking sub-module 704 is configured to lock the cloud storage interval to be updated and to calculate a second content check value of the cloud storage interval to be updated.

Sending sub-module 705 is configured to send information of the target cloud storage interval to a memory management unit when the first content check value matches the second content check value.

In order to ensure the integrity and security of data migration, in this example, replicating module 603 implements replacement and update between cloud storage intervals and data migration based on content verification. Specifically, the data directory information, such as page table entries, of the cloud storage interval to be updated is cleared in a memory management unit (MMU) and a virtualization extended page table (EPT) by clearing sub-module 701. Then, the data in the cloud storage interval to be updated is replicated to the target cloud storage interval by replicating sub-module 702. A first content check value of the target cloud storage interval obtained after the data being replicated is calculated by calculating sub-module 703. The first content check value is used to be compared with a subsequent second content check value of the cloud storage interval to be updated to determine a consistency of data content between the cloud storage intervals. If the first content check value matches the second content check value, for example, the first content check value is equal to the second content check value, it indicates that the data stored in the cloud storage interval to be updated is consistent with the data content stored in the target cloud storage interval after the data is migrated, that means there is no data change during the data migration process. Then, the cloud storage interval to be updated is locked by first locking sub-module 704. For example, the cloud storage interval to be updated is marked as write-protected by the virtualization extended page table (EPT). And a second content check value of the cloud storage interval to be updated is calculated. Finally, the first content check value is compared with the second content check value by sending sub-module 705. As described above, when the first content check value matches the second content check value, it is considered that there is no data change during the data migration process, that is, the data migration is successful. At this time, the information of the target cloud storage interval can be sent to the memory management unit to update management information of the cloud storage interval stored in the memory management unit.

In some embodiments of the present disclosure, the data directory information can include one or more of the following information: a physical address, attribute information of a corresponding cloud storage interval, and etc.

In some embodiments of the present disclosure, the content check value can be obtained by calculation using an MD5 Message-Digest Algorithm. The MD5 Message-Digest Algorithm is a cryptographic hash function that can generate a hash value with a certain length to represent content to be checked. Of course, the content check value can also be calculated by using another content check value calculation method. Those skilled in the art may select a suitable content check value calculation method according to the needs of practical applications and the characteristics of the content to be checked, for which there is no specific limitation in the present disclosure.

Figure 8:
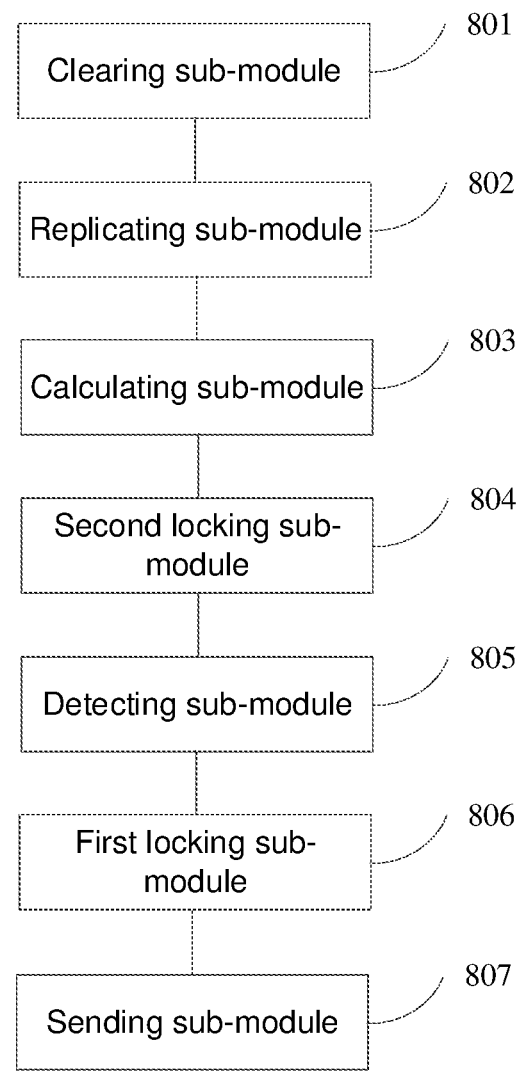
FIG. 8 shows another exemplary structural block diagram of replicating module 603 according to the embodiment shown in FIG. 6.

In some embodiments of the present disclosure, after a first content check value of the target cloud storage interval is calculated by the calculating sub-module 703, the apparatus can further include a part for determining whether the target cloud storage interval is likely to be accessed in a short time. As shown in FIG. 8, replicating module 603 can further include a clearing sub-module 801, a replicating sub-module 802, a calculating sub-module 803, a second locking sub-module 804, a detecting sub-module 805, a first locking sub-module 806, and a sending sub-module 807.

Clearing sub-module 801 is configured to clear data directory information of the cloud storage interval to be updated.

Replicating sub-module 802 is configured to replicate data in the cloud storage interval to be updated to the target cloud storage interval.

Calculating sub-module 803 is configured to calculate a first content check value of the target cloud storage interval obtained after the data is replicated.

Second locking sub-module 804 is configured to lock an input/output index address ring data component. The input/output index address ring data component stores an index address pointing to a physical address corresponding to the cloud storage interval.

Detecting sub-module 805 is configured to detect whether a distance between a position of the target cloud storage interval in the input/output index address ring data component and a current operating position of the input/output index address ring data component is greater than a preset distance threshold.

First locking sub-module 806 is configured to, when the distance between the position of the target cloud storage interval and the current operating position of the input/output index address ring data component is greater than or equal to the preset distance threshold, lock the cloud storage interval to be updated, and calculate a second content check value of the cloud storage interval to be updated.

Sending sub-module 807 is configured to send information of the target cloud storage interval to a memory management unit when the first content check value matches the second content check value.

In order to prevent the target cloud storage interval from being accessed during the implementation of data migration, which can lead to errors in the migrated data, in this example, after the first content check value of the target cloud storage interval obtained after the data being replicated is calculated by calculating sub-module 803. Second locking sub-module 804 is configured to lock the input/output index address ring data component storing the index address pointing to the physical address corresponding to the cloud storage interval. For example, the input/output index address ring data component is marked as write-protected by the virtualization extended page table (EPT) to prevent the CPU side from operating on the input/output index address ring data component. Therefore, the target cloud storage interval of the data write operation in the current state being a certain set can be guaranteed, and an operation on the input/output index address ring data component by the virtual machine during the data migration process, which can further affect the data migration, can be prevented. Then, detecting sub-module 805 is configured to detect whether a distance between the position of the target cloud storage interval in the input/output index address ring data component and the current operation position of the input/output index address ring data component is greater than a preset distance threshold, which is equivalent to detecting whether a page to be replaced is in an inbound direction of the input/output index address ring data component to determine whether the data migration operation of the target cloud storage interval is secure within a preset time period, for example, whether the data migration operation conflicts with the operation of the input/output index address ring data component, or whether the target cloud storage interval is likely to be accessed in a short time. The preset time period is at least greater than or equal to a time required for the data migration. When the distance between the position of the target cloud storage interval and the current operating position of the input/output index address ring data component is greater than or equal to the preset distance threshold, or when the page that needs to be replaced is not in the inbound direction of the input/output index address ring data component, it is considered that the data migration operation of the target cloud storage interval is secure within the preset time period, the target cloud storage interval will not be accessed in a short time, and the data migration operation does not conflict with the operation of the input/output index address ring data component. At this time, first locking sub-module 806 locks the cloud storage interval to be updated and calculates the second content check value of the cloud storage interval to be updated.

In some embodiments of the present disclosure, when the distance between the position of the target cloud storage interval and the current operating position of the input/output index address ring data component is less than the preset distance threshold, or when the page that needs to be replaced is in the inbound direction of the input/output index address ring data component, it is considered that the data migration operation of the target cloud storage interval may be insecure within the preset time period, for example, the target cloud storage interval may be accessed in a short time, or the data migration operation may conflict with the operation of the input/output index address ring data component. At this time, it is required to unlock the input/output index address ring data component first and enters a sleep state. After a preset time, clearing sub-module 801 is configured to clear the data directory information of the cloud storage interval to be updated again, to avoid the risk of a data operation conflict that may occur.

Figure 9:
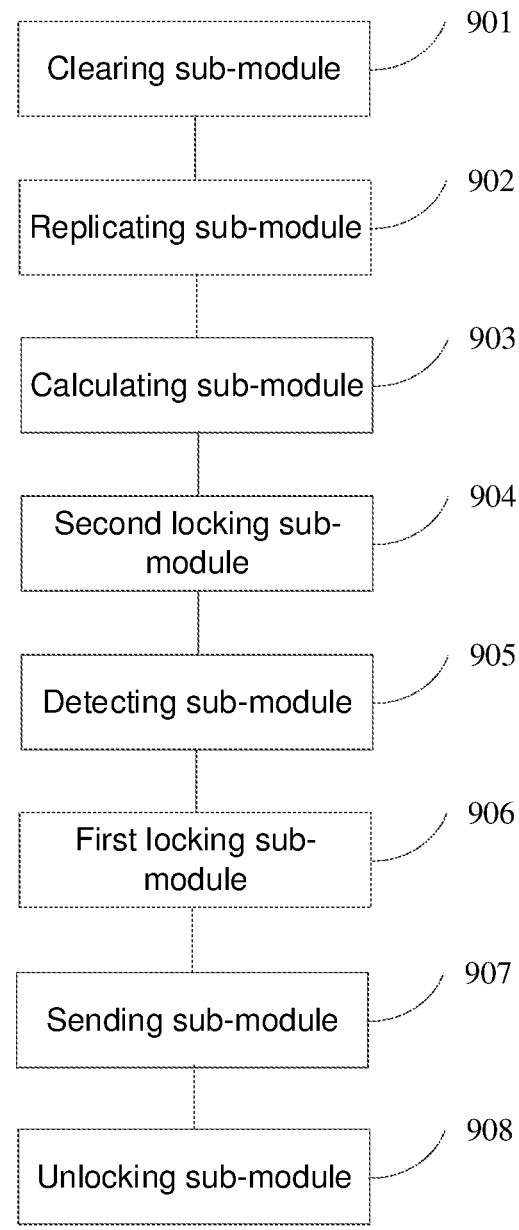
FIG. 9 shows yet another exemplary structural block diagram of replicating module 603 according to the embodiment shown in FIG. 6.

In some embodiments of the present disclosure, as shown in FIG. 9, replicating module 603 can further include a clearing sub-module 901, a replicating sub-module 902, a calculating sub-module 903, a second locking sub-module 904, a detecting sub-module 905, a first locking sub-module 906, a sending sub-module 907, and an unlocking sub-module 908.

Clearing sub-module 901 is configured to clear data directory information of the cloud storage interval to be updated.

Replicating sub-module 902 is configured to replicate data in the cloud storage interval to be updated to the target cloud storage interval.

Calculating sub-module 903 is configured to calculate a first content check value of the target cloud storage interval obtained after the data is replicated.

Second locking sub-module 904 is configured to lock an input/output index address ring data component. The input/output index address ring data component stores an index address pointing to a physical address corresponding to the storage interval.

Detecting sub-module 905 is configured to detect whether a distance between a position of the target cloud storage interval in the input/output index address ring data component and a current operating position of the input/output index address ring data component is greater than a preset distance threshold.

First locking sub-module 906 is configured to, when the distance between the position of the target cloud storage interval and the current operating position of the input/ output index address ring data component is greater than or equal to the preset distance threshold, lock the cloud storage interval to be updated, and calculate the second content check value of the cloud storage interval to be updated.

Sending sub-module 907 is configured to send information of the target cloud storage interval to a memory management unit when the first content check value matches the second content check value.

Unlocking sub-module 908 is configured to, when the distance between the position of the target cloud storage interval and the current operating position of the input/output index address ring data component is less than the preset distance threshold, unlock the input/output index address ring data component and make input/output index address ring data component enter a sleep state. After a preset time, unlocking sub-module 908 is configured to recall clearing sub-module 901 to clear the data directory information of the cloud storage interval to be updated again.

In some embodiments of the present disclosure, as described above, when the first content check value matches the second content check value, it indicates that the data stored in the cloud storage interval to be updated is consistent with the data content stored in the target cloud storage interval after the data migration, and there is no data change in the data migration process. Therefore, the information of the target cloud storage interval can be sent to the memory management unit (MMU) or input/output memory management unit (IOMMU) for data update. At this time, it is considered that the data migration process is completed. The input/output index address ring data component can be unlocked by the virtualization extended page table (EPT), that is, the write protection of the input/output index address ring data component is removed to restore the normal access operations of the input/output index address ring data component. In this example, the sending sub-module 705 can be configured to send the information of the target cloud storage interval to the memory management unit when the first content check value matches the second content check value, and unlock the input/output index address ring data component.

Figure 10:
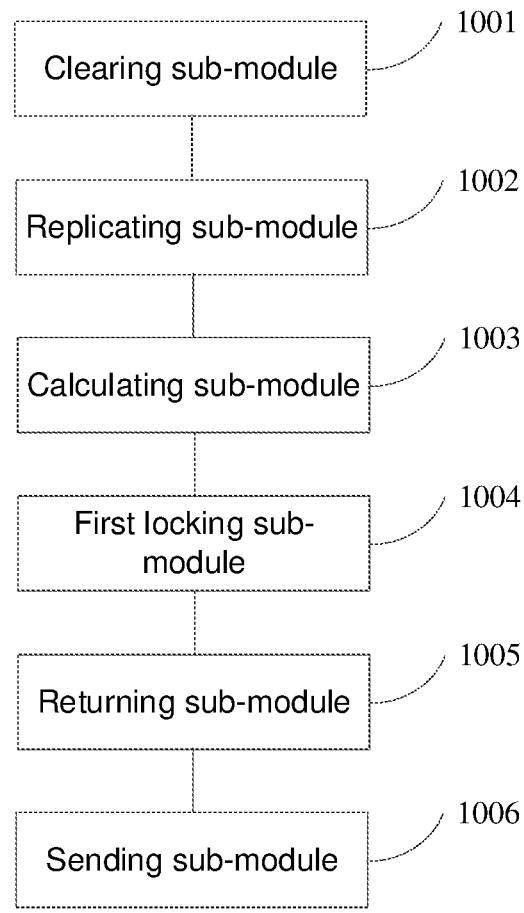
FIG. 10 shows yet another exemplary structural block diagram of replicating module 603 according to the embodiment shown in FIG. 6.

In some embodiments of the present disclosure, after locking the cloud storage interval to be updated, and calculating a second content check value of the cloud storage interval to be updated by first locking sub-module 704, the apparatus can further include a part for returning to replicate the data in the cloud storage interval to be updated to the target cloud storage interval again when the first content check value does not match the second content check value. As shown in FIG. 10, replicating module 603 can further include a clearing sub-module 1001, a replicating sub-module 1002, a calculating sub-module 1003, a first locking sub-module 1004, a returning sub-module 1005, and a sending sub-module 1006.

Clearing sub-module 1001 is configured to clear data directory information of the cloud storage interval to be updated.

Replicating sub-module 1002 is configured to replicate the data in the cloud storage interval to be updated to the target cloud storage interval.

Calculating sub-module 1003 is configured to calculate a first content check value of the target cloud storage interval obtained after the data is replicated.

First locking sub-module 1004 is configured to lock the cloud storage interval to be updated and to calculate a second content check value of the cloud storage interval to be updated.

Returning sub-module 1005 is configured to, when the first content check value does not match the second content check value, recall replicating sub-module 1002 to replicate the data in the cloud storage interval to be updated to the target cloud storage interval again.

Sending sub-module 1006 is configured to send information of the target cloud storage interval to a memory management unit when the first content check value matches the second content check value.

When the first content check value does not match the second content check value, it means that the data stored in the cloud storage interval to be updated is inconsistent with the data content stored in the target cloud storage interval after data migration, and data change may occur in the data migration process. At this time, it is necessary to configure returning sub-module 1005 to recall replicating module 1002 to replicate the data in the cloud storage interval to be updated to the target cloud storage interval again, and perform the data migration operation again.

Figure 11:
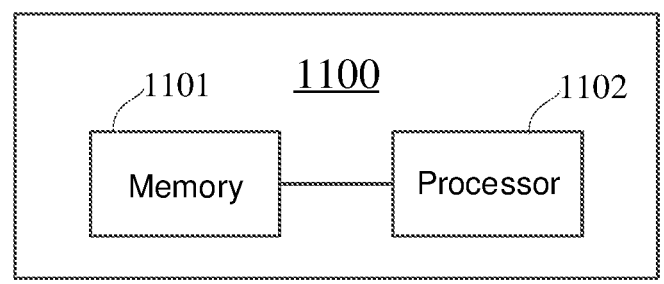
FIG. 11 shows an exemplary structural block diagram of an electronic device according to some embodiments of the present disclosure.

The embodiments of the present disclosure further disclose an electronic device. FIG. 11 shows a structural block diagram of an electronic device according to some embodiments of the present disclosure. As shown in FIG. 11, an electronic device 1100 includes a memory 1101 and a processor 1102.

Memory 1101 is configured to store one or more computer instructions. The one or more computer instructions, when executed by one or more processors (e.g., processor 1102), implement steps of any one of the above methods to cause the electronic device to perform the previously disclosed methods.

Figure 12:
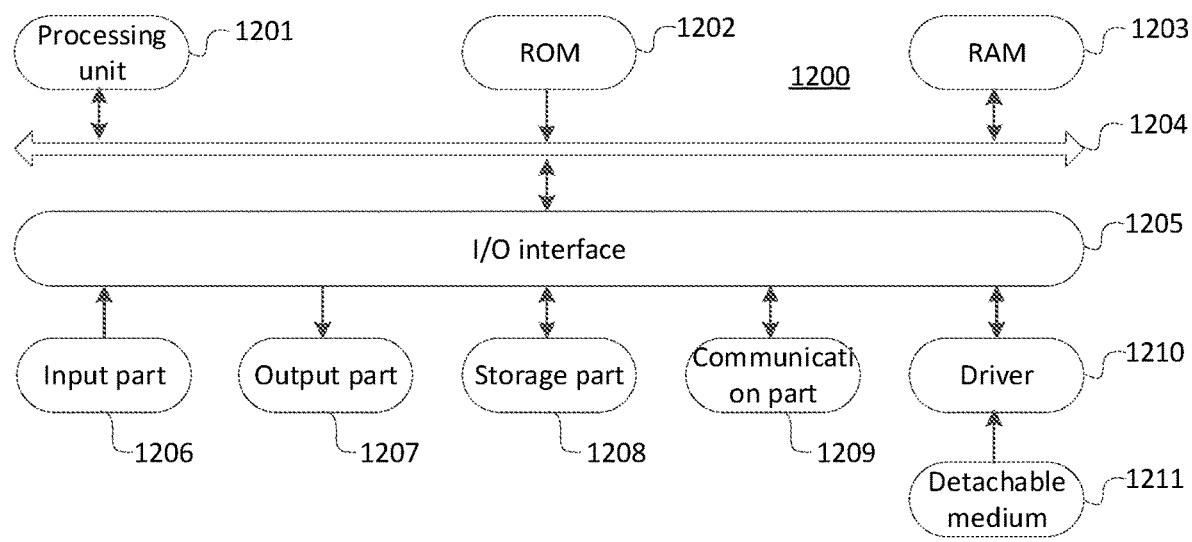
FIG. 12 is an exemplary schematic structural diagram of a computer system suitable for implementing a method for storage interval updating according to some embodiments of the present disclosure.

FIG. 12 is a schematic structural diagram of a computer system for implementing a storage interval updating method according to some embodiments of the present disclosure.

As shown in FIG. 12, a computer system 1200 includes a processing unit 1201, which can execute various processing in the above embodiments according to a program stored in a read-only memory (ROM) 1202 or a program loaded from a storage part 1208 into a random access memory (RAM) 1203. Various programs and data required for the operation of system 1200 are also stored in RAM 1203. Processing unit 1201, ROM 1202, and RAM 1203 are connected to each other through a bus 1204. An input/output (I/O) interface 1205 is also connected to bus 1204.

The following members are connected to I/O interface 1205: an input part 1206 including a keyboard, a mouse, and the like; an output part 1207 including a cathode ray tube (CRT), a liquid crystal display (LCD), a speaker, and the like; a storage part 1208 including a hard disk and the like; and a communication part 1209 including a network interface card such as a LAN card, a modem, and the like. Communication part 1209 performs communication processing via a network such as the Internet. A driver 1210 is also connected to I/O interface 1205 as needed. A detachable medium 1211, such as a magnetic disk, an optical disk, a magneto-optical disk, and a semiconductor memory, is installed on driver 1210 as needed, so that the computer program read therefrom is installed into storage part 1208 as needed. Processing unit 1201 may be implemented as a CPU (Central Processing Unit), a GPU (General Processing Unit), an FPGA (Field Programmable Gate Array), an NPU (Natural Processing Unit), and an AI (Artificial Intelligence) chip.

In particular, according to the embodiments of the present disclosure, the method described above may be implemented as a computer software program. For example, the embodiments of the present disclosure include a computer program product including a computer program tangibly contained on a readable medium thereof, and the computer program includes program code for performing the storage interval updating method. In such embodiments, the computer program may be downloaded and installed from the network through communication part 1209, and/or installed from detachable medium 1211.

The flow charts and block diagrams in the accompanying drawings illustrate the possible implementation architecture, functions, and operations of the system, method, and computer program product according to various embodiments of the present application. In this regard, each block in the flow chart or block diagram may represent a module, program segment, or part of the code, and the module, program segment, or part of the code contains one or more executable instructions for realizing specified logic functions. It should also be noted that, in some alternative implementations, the functions marked in the block may also occur in an order different from the order marked in the accompanying drawings. For example, two blocks shown in succession may actually be performed substantially in parallel, and they may sometimes be performed in a reverse order, depending on functions involved. It should also be noted that each block in the block diagram and/or flow chart, and the combination of blocks in the block diagram and/or flow chart, may be implemented by a dedicated hardware-based system that performs the specified functions or operations, or may be realized by a combination of dedicated hardware and computer instructions.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A cloud storage interval updating method, comprising:
   determining a cloud storage interval to be updated in a cloud storage system;
   determining a target cloud storage interval in the cloud storage system;
   and
   replicating data in the cloud storage interval to be updated to the target cloud storage interval based on a content verification, wherein replicating data in the cloud storage interval to be updated to the target cloud storage interval based on the content verification further comprises:
   calculating a first content check value of the target cloud storage interval obtained after the data in the cloud storage interval to be updated is replicated;
   locking an input/output index address ring data component, wherein the input/output index address ring data component stores an index address pointing to a physical address corresponding to the cloud storage interval;
   detecting whether an address of the target cloud storage interval is in an inbound direction of the input/output index address ring data component;
   when the address of the target cloud storage interval is in the inbound direction of the input/output index address ring data component, locking the cloud storage interval to be updated, and calculating a second content check value of the cloud storage interval to be updated; and
   sending information of the target cloud storage interval to a memory management unit when the first content check value matches the second content check value.

2. The cloud storage interval updating method according to claim 1, wherein replicating the data in the cloud storage interval to be updated to the target cloud storage interval based on the content verification further comprises:

clearing data directory information of the cloud storage interval to be updated; and replicating the data in the cloud storage interval to be updated to the target cloud storage interval.

3. The cloud storage interval updating method according to claim 2, wherein after detecting whether the address of the target cloud storage interval is in the inbound direction of the input/output index address ring data component, the method further comprises:

when the address of the target cloud storage interval is not in the inbound direction of the input/output index address ring data component, unlocking the input/output index address ring data component to enter a sleep state; and returning to clear the data directory information of the cloud storage interval to be updated again after a preset time.

4. The cloud storage interval updating method according to claim 3, wherein sending information of the target cloud storage interval to the memory management unit when the first content check value matches the second content check value is implemented as:

sending the information of the target cloud storage interval to the memory management unit when the first content check value matches the second content check value; and unlocking the input/output index address ring data component.

5. The cloud storage interval updating method according to claim 1, wherein after locking the cloud storage interval to be updated, and calculating the second content check value of the cloud storage interval to be updated, the method further comprises:

when the first content check value does not match the second content check value, returning to replicate the data in the cloud storage interval to be updated to the target cloud storage interval again.

6. A cloud storage interval updating apparatus, comprising:

a memory figured to store instructions; and one or more processors configured to execute the instructions to cause the apparatus to perform:

determining a cloud storage interval to be updated in a cloud storage system;

determining a target cloud storage interval in the cloud storage system; and replicating data in the cloud storage interval to be updated to the target cloud storage interval based on a content verification, wherein replicating data in the cloud storage interval to be updated to the target cloud storage interval based on the content verification further comprises:

calculating a first content check value of the target cloud storage interval obtained after the data in the cloud storage interval to be updated is replicated;

locking an input/output index address ring data component, wherein the input/output index address ring data component stores an index address pointing to a physical address corresponding to the cloud storage interval;

detecting whether an address of the target cloud storage interval is in an inbound direction of the input/output index address ring data component;

when the address of the target cloud storage interval is in the inbound direction of the input/output index address ring data component, locking the cloud storage interval to be updated, and calculating a second content check value of the cloud storage interval to be updated; and sending information of the target cloud storage interval to a memory management unit when the first content check value matches the second content check value.

7. The cloud storage interval updating apparatus according to claim 6, wherein in replicating data in the cloud storage interval to be updated to the target cloud storage interval based on a content verification, the one or more processors are further configured to execute the instructions to cause the apparatus to perform:

clearing data directory information of the cloud storage interval to be updated; and replicating the data in the cloud storage interval to be updated to the target cloud storage interval.

8. The cloud storage interval updating apparatus according to claim 7, wherein in replicating data in the cloud storage interval to be updated to the target cloud storage interval based on a content verification, the one or more processors are further configured to execute the instructions to cause the apparatus to perform:

when the address of the target cloud storage interval is not in the inbound direction of the input/output index address ring data component, unlocking the input/output index address ring data component to enter a sleep state, and returning to clear the data directory information of the cloud storage interval to be updated again after a preset time.

9. The cloud storage interval updating apparatus according to claim 8, wherein the one or more processors are further configured to execute the instructions to cause the apparatus to perform:

sending the information of the target cloud storage interval to the memory management unit when the first content check value matches the second content check value, for unlocking the input/output index address ring data component.

10. The cloud storage interval updating apparatus according to claim 6, wherein after locking the cloud storage interval to be updated and calculate a second content check value of the cloud storage interval to be updated, the one or more processors are further configured to execute the instructions to cause the apparatus to perform:

when the first content check value does not match the second content check value, returning to replicate the data in the cloud storage interval to be updated to the target cloud storage interval again.

11. A computer-readable storage medium that stores a set of instructions that is executable by one or more processors of an apparatus to cause the apparatus to initiate a method for cloud storage interval updating, the method comprising:

determining a cloud storage interval to be updated in a cloud storage system;

determining a target cloud storage interval in the cloud storage system; and replicating data in the cloud storage interval to be updated to the target cloud storage interval based on a content verification, wherein replicating data in the cloud storage interval to be updated to the target cloud storage interval based on the content verification further comprises:

calculating a first content check value of the target cloud storage interval obtained after the data in the cloud storage interval to be updated is replicated;

locking an input/output index address ring data component, wherein the input/output index address ring data component stores an index address pointing to a physical address corresponding to the cloud storage interval;

detecting whether an address of the target cloud storage interval is in an inbound direction of the input/output index address ring data component;

when the address of the target cloud storage interval is in the inbound direction of the input/output index address ring data component, locking the cloud storage interval to be updated, and calculating a second content check value of the cloud storage interval to be updated; and sending information of the target cloud storage interval to a memory management unit when the first content check value matches the second content check value.

12. The computer readable storage medium of claim 11, wherein in replicating the data in the cloud storage interval to be updated to the target cloud storage interval based on the content verification, the set of instructions that is executable by one or more processors of an apparatus to cause the apparatus to further perform:

clearing data directory information of the cloud storage interval to be updated; and replicating the data in the cloud storage interval to be updated to the target cloud storage interval.

13. The computer readable storage medium of claim 12, wherein after detecting whether the address of the target cloud storage interval is in the inbound direction of the input/output index address ring data component, the set of instructions that is executable by one or more processors of an apparatus to cause the apparatus to further perform:

when the address of the target cloud storage interval is not in the inbound direction of the input/output index address ring data component, unlocking the input/output index address ring data component to enter a sleep state; and returning to clear the data directory information of the cloud storage interval to be updated again after a preset time.

14. The computer readable storage medium claim 13, wherein in sending information of the target cloud storage interval to the memory management unit when the first content check value matches the second content check value, the set of instructions that is executable by one or more processors of an apparatus to cause the apparatus to further perform:

sending the information of the target cloud storage interval to the memory management unit when the first content check value matches the second content check value; and unlocking the input/output index address ring data component.

15. The computer readable storage medium claim 11, wherein after locking the cloud storage interval to be updated, and calculating the second content check value of the cloud storage interval to be updated, the set of instructions that is executable by one or more processors of an apparatus to cause the apparatus to further perform:

when the first content check value does not match the second content check value, returning to replicate the data in the cloud storage interval to be updated to the target cloud storage interval again.

* * * * *